United States Patent [19]

Martin

[11] Patent Number: 4,847,038
[45] Date of Patent: Jul. 11, 1989

[54] PROCEDURE FOR COMPLETE REPLACEMENT OF A STEAM GENERATOR OF A PRESSURIZED WATER NUCLEAR REACTOR

[75] Inventor: Alain Martin, Caluire, France

[73] Assignee: Framatome, Courbevoie, France

[21] Appl. No.: 187,000

[22] Filed: Apr. 27, 1988

[30] Foreign Application Priority Data

Apr. 27, 1987 [FR] France .................................. 87 05936

[51] Int. Cl.$^4$ ............................................ G21C 21/00
[52] U.S. Cl. .................................. 376/260; 29/402.08; 376/258
[58] Field of Search ............... 376/260, 245, 258, 461; 29/402.08, 157.4; 165/76; 122/DIG. 11

[56] References Cited

U.S. PATENT DOCUMENTS

| | | | |
|---|---|---|---|
| 4,199,857 | 4/1980 | Meuschke et al. | 376/260 |
| 4,230,527 | 10/1980 | Cella | 376/402 |
| 4,345,549 | 8/1982 | Colmano | 376/461 |

OTHER PUBLICATIONS

"Preparing to Replace the Lower Assemblies at Cook", Harshbarger, NEI, 1/88, pp. 26–28.
Nuclear Safety, vol. 23, No. 1, 1/82, pp. 76–79.
"Replacing the Steam Generators at Surry Unit 2", Parrish, NEI, 5/80, pp. 21–28.
"Point Beach I Steam Generators Replaced Well Ahead of Schedule", Moers et al., NEI, 1/85, pp. 38–42.
"Why the Steam Generates are Being Replaced at Ringhals 2", NEI, 11/85, pp. 44–45.
Lardelli, Microtecnic, No. 3, 1984, pp. 40–43.

Primary Examiner—Deborah L. Kyle
Assistant Examiner—Daniel Wasil
Attorney, Agent, or Firm—Pollock, Vande Sande & Priddy

[57] ABSTRACT

The method consists in separating the worn-out steam generator (1) from the primary circuit, by sectioning the pipes (3, 5) in the vicinity of the steam generator pipework, withdrawing the worn-out steam generator, placing a replacement steam generator in position and welding the pipe work of the replacement steam generator to the primary pipes (3, 5). Topometric measurements are carried out on the replacement generator, on the worn-out steam generator (1) in position in its compartment (11) and in the compartment (11) after the removal of the worn-out generator (1). Comparison of the topometric measurements enables the replacement procedure to be determined, i.e., the number of cuts to be made on the primary pipes (3, 5), the modifications to be made to the supporting and positioning devices (8, 17) and the position of the chamfers for welding the pipes (3, 5) and the pipework of the replacement steam generator.

3 Claims, 14 Drawing Sheets

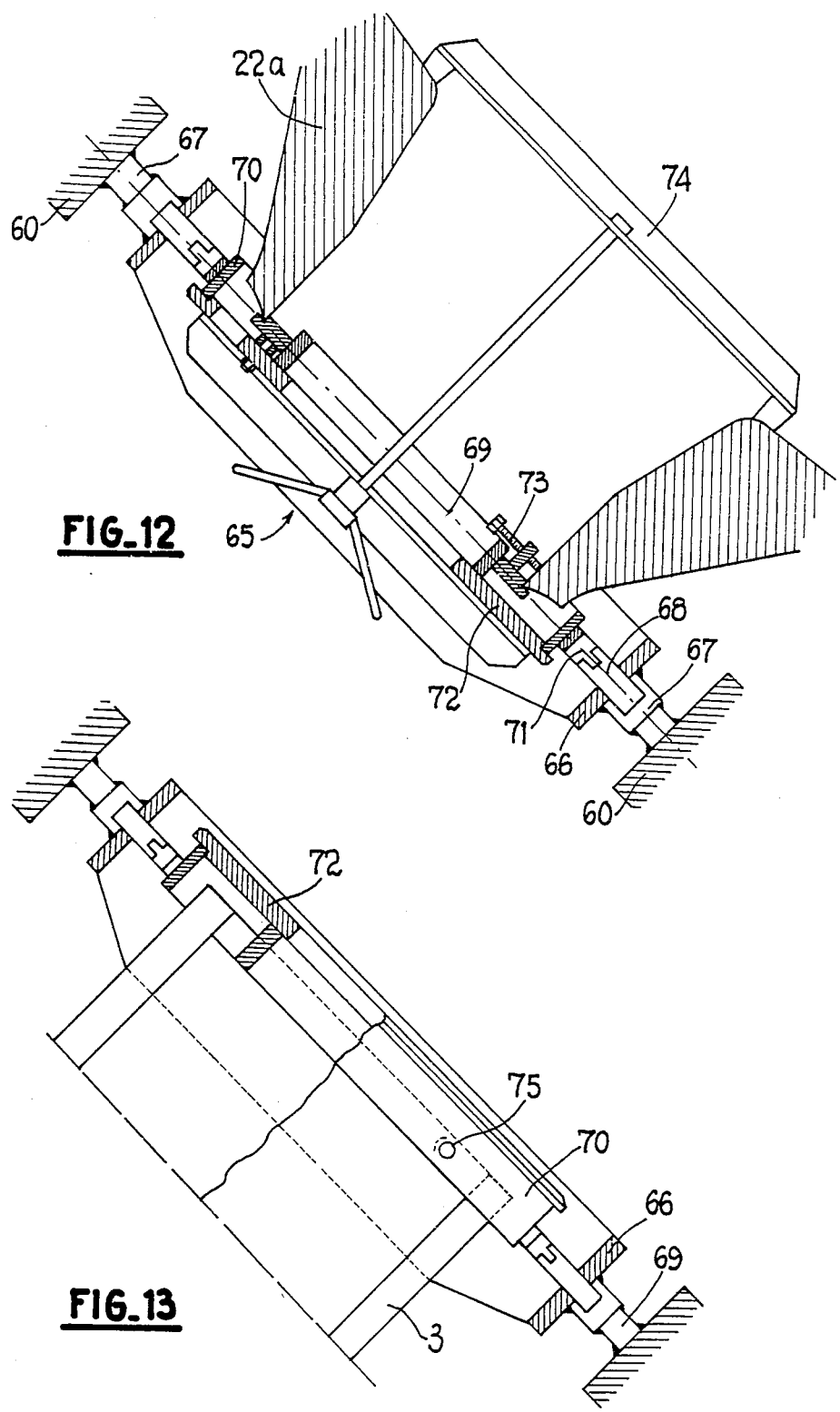
FIG_12
FIG_13

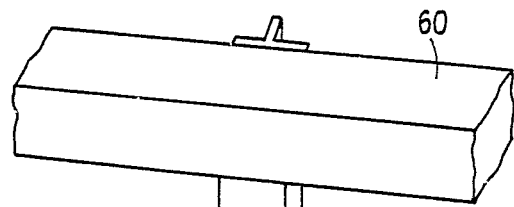
FIG.14
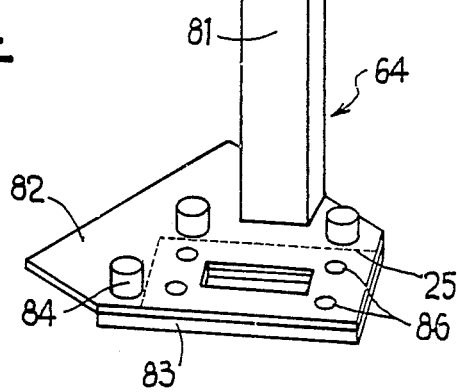
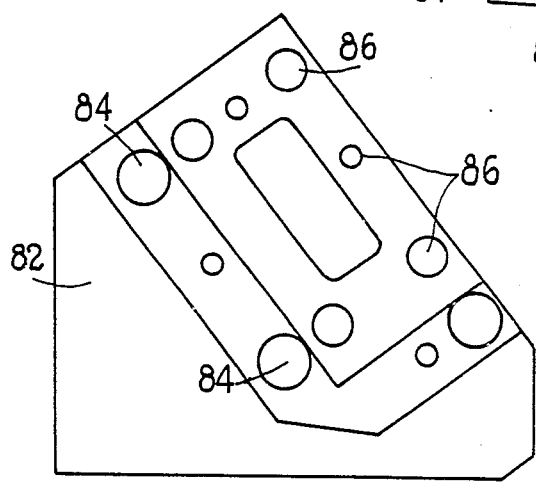
FIG.15
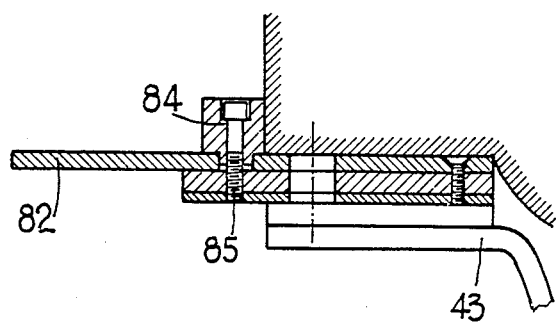
FIG.16

PROCEDURE FOR COMPLETE REPLACEMENT OF A STEAM GENERATOR OF A PRESSURIZED WATER NUCLEAR REACTOR

FIELD OF THE INVENTION

The invention relates to a method for complete replacement of a worn-out steam generator of a pressurized water nuclear reactor.

BACKGROUND OF THE INVENTION

Pressurized water nuclear reactors comprise, inside a reactor building, a vessel containing the reactor core, filled with pressurized water, as well as a primary circuit consisting of several loops in communication with the vessel. Each of the primary circuit loops comprises a steam generator in which pressurized water is cooled while heating and vaporizing the feed water. The steam generators are placed in compartments known as bunkers, arranged inside the reactor building.

The steam generators of each of the loops are connected to the vessel by pressurized water inlet and outlet pipes known as primary pipes. These pipes are connected to the water box of the steam generator situated in its lower part, by means of pipework fixed to the water box.

After a certain period of operation, the steam generators which contain a bundle of heat exchange tubes responsible for the separation between the primary water and the feed water have to be checked and, if certain tubes of the bundle show leakages, these tubes must be closed by means of a plug or must be lined, to prevent contamination of the feed water.

When the steam generator has operated for a long time, it may be found necessary to replace some or all of the tubes of the bundle.

However, this operation is complicated, with the result that the complete replacement of the steam generators of pressurized water nuclear reactors is now being envisaged.

This replacement operation requires a sectioning of the primary pipes in the vicinity of the pipework connecting the worn-out generator and welding the pipework of the new replacement steam generator to the primary pipes left in preparation.

In the case where a new steam generator is installed in a nuclear power station under construction, the steam generator is placed in position in the bunker on vertical support props, and its connection to the reactor vessel and to the primary pump of the corresponding loop is then effected by means of primary pipe sections which are assembled end to end. Shimming of the steam generator in the bunker is then ensured by placing supporting devices around the steam generator, allowance being made for the mounting clearances which are required when the steam generator operates at high temperature.

The primary pipe sections responsible for connecting the loop members may be easily adapted in order to allow for the relative position of the components.

On the other hand, in the case where a worn-out steam generator of a nuclear reactor which has already been in operation is completely replaced, the new replacement generator has to be connected to an existing primary loop in which the worn-out steam generator is situated.

In theory, it is possible to envisage modifying the geometry of this loop, by sectioning considerable lengths of the primary pipes connecting the steam generator. However, there is a risk that the total duration of the operations enabling the steam generator to be replaced may be very long, and this correspondingly lengthens the period during which the nuclear reactor is not available. Furthermore, the primary pipes which are sectioned have been contaminated by the radioactive primary fluid, with the result that a decontamination must be carried out before work is done on the pipe, in all the regions where a sectioning operation is to take place.

It has therefore appeared preferable to connect the new steam generator to the primary circuit after having performed the sectioning of a minimum length of the primary connection pipes of the existing circuit.

Wherever possible, only a single sectioning of each of the primary connecting pipes is performed, in the vicinity of the pipework of the worn-out steam generator.

After extraction of the worn-out steam generator from the bunker, the ends of the pipes left in preparation are machined in order to produce on these ends chamfers in positions enabling them to be placed to coincide with the corresponding chamfers machined on the pipework of the new steam generator.

Certain unavoidable differences exist, furthermore, between the new steam generator and the worn-out steam generator, in respect of their geometry.

These differences influence the feasibility and the ease of implementing the procedure for replacing the steam generator, insofar as they affect the parts of the steam generator to be coupled to the primary circuit and the bearing or positioning means of the steam generator which interact with the corresponding supporting and positioning means which remain in position in the bunker.

Until now there was no known procedure which made it possible to ensure the complete replacement of a worn-out steam generator of a pressurized water nuclear reactor, with an accurate determination of the sectioning to be carried out, of the position of the chamfers for welding and of the modifications to be made to the supporting and holding device.

SUMMARY OF THE INVENTION

The purpose of the invention is therefore to provide a method for complete replacement of a worn-out steam generator of a pressurized water nuclear reactor, which comprises a reactor building defining a compartment in which the steam generator is fastened in a specified position, by virtue of supporting and positioning devices placed in the compartment and a primary circuit arranged in the reactor building in which pressurized water circulates, comprising two pipes connected to the lower part of the steam generator, in the vicinity of the corresponding pipework which is fixed to the steam genertor, the method consisting in separating the worn-out steam generator from the primary circuit by sectioning the pipes in the vicinity of the steam generator pipework, withdrawing the worn-out steam generator from the compartment, placing a new replacement steam generator in position in the compartment and welding the pipework of the new steam generator to the corresponding pipes in the region of the welding chamfers, this procedure making it possible to determine reliably the replacement procedure, the modifications to be made to the supporting and positioning devices and the position of the chamfers for welding on the primary pipes.

To this end:

(a) topometric measurements are carried out on the new steam generator to determine exactly the position of its supporting and positioning parts intended to come to bear on the supporting and positioning devices of the compartment and the geometry of the pipework for connection to the primary circuit, (b) topometric measurements are carried out in the compartment and on the worn-out steam generator to determine the geometry of the connections to the primary circuit and of the supporting and positioning devices, (c) a comparison of the topometric measurements which are carried out is used to determine the replacement procedure to be employed, i.e., the number and the position of the sectioning operations to be carried out on the primary pipes and the modifications to be made to the supporting and positioning devices, for placing the new steam generator in position, (d) the envisaged sectioning operations and the withdrawal of the worn-out steam generator are carried out, followed by the grinding of the sectioned surfaces on the primary pipes, (e) topometric measurements are carried out in the compartment after withdrawal of the worn-out steam generator, to determine the exact position of the supporting and positioning devices and of the sectioned ends of the primary pipes, (f) the feasibility of implementing the replacement procedure is verified by comparison of the measurements carried out, (g) the exact position of the welding chamfers onto the ends of the primary pipes is determined, and (h) the corresponding chamfers are machined, the new steam generator and its supporting and positioning devices are placed in position and welding of the pipework is performed.

BRIEF DESCRIPTION OF THE DRAWINGS

In order that the invention may be more clearly understood, a description will now be given, by way of example, with reference to the attached drawings, of an embodiment of the replacement procedure according to the invention.

FIG. 7b is a plan view corresponding to FIG. 7a.

FIG. 12 is a sectional view on a larger scale of a part of the framework shown in FIG. 10, in position on the replacement steam generator.

FIG. 13 is a sectional view of the same part of the framework in position at the end of a primary pipe.

FIG. 14 is a perspective view of a part of the framework forming a foot for positioning this framework in the bunker of the steam generator.

FIG. 15 is a plan view of the positioning foot shown in FIG. 14.

FIG. 16 is a sectional view of the positioning foot shown in FIGS. 14 and 15, during its adjustment on the new replacement steam generator.

DETAILED DESCRIPTION

Figure 1:
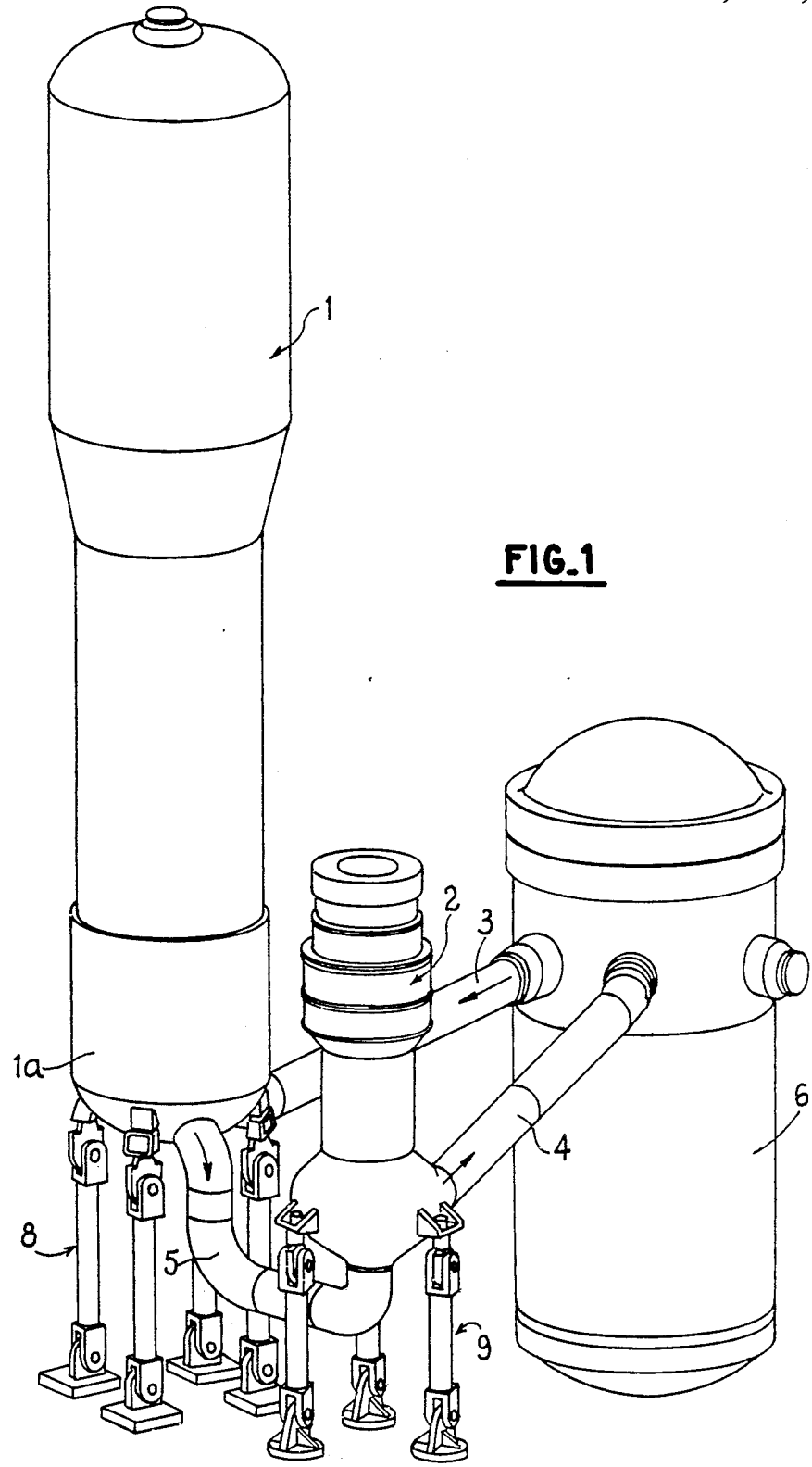
FIG. 1 is a perspective view of a loop of a pressurized water nuclear reactor in which a replacement of a worn-out steam generator is being carried out.

FIG. 1 shows a primary circuit loop of a pressurized water nuclear reactor comprising a steam generator 1, a primary pump 2 and primary pipes 3 and 4 enabling the reactor vessel 6 to be connected to the steam generator and to the primary pump, respectively, as well as a pipe 5 enabling the steam generator 1 to be connected to the primary pump 2. The primary pipes 3 and 5 are connected to the lower part 1a of the steam generator, which forms a water box.

Pressurized water for cooling the reactor is circulated through the loop by the primary pump 2. The water heated in contact with the core arranged in the reactor vessel 6 enters the water box 1a of the steam generator through the primary pipe 3 known as the hot leg. The water then travels through the steam generator tubes, where it cools while heating and vaporizing the feed water. The cooled water then returns to the outlet part of the water box 1a and is then conveyed to the reactor vessel via the pipes 5 and 4, the pipe 4 forming the cold leg. The pipe 5, which provides the connection between the steam generator 1 and the primary pump 2, is U-shaped and, because of this, is referred to by the name of U leg. The steam generator 1 and the primary pump 2 are placed with their axes vertical and rest on articulated prop assemblies 8 and 9, respectively.

Figure 2:
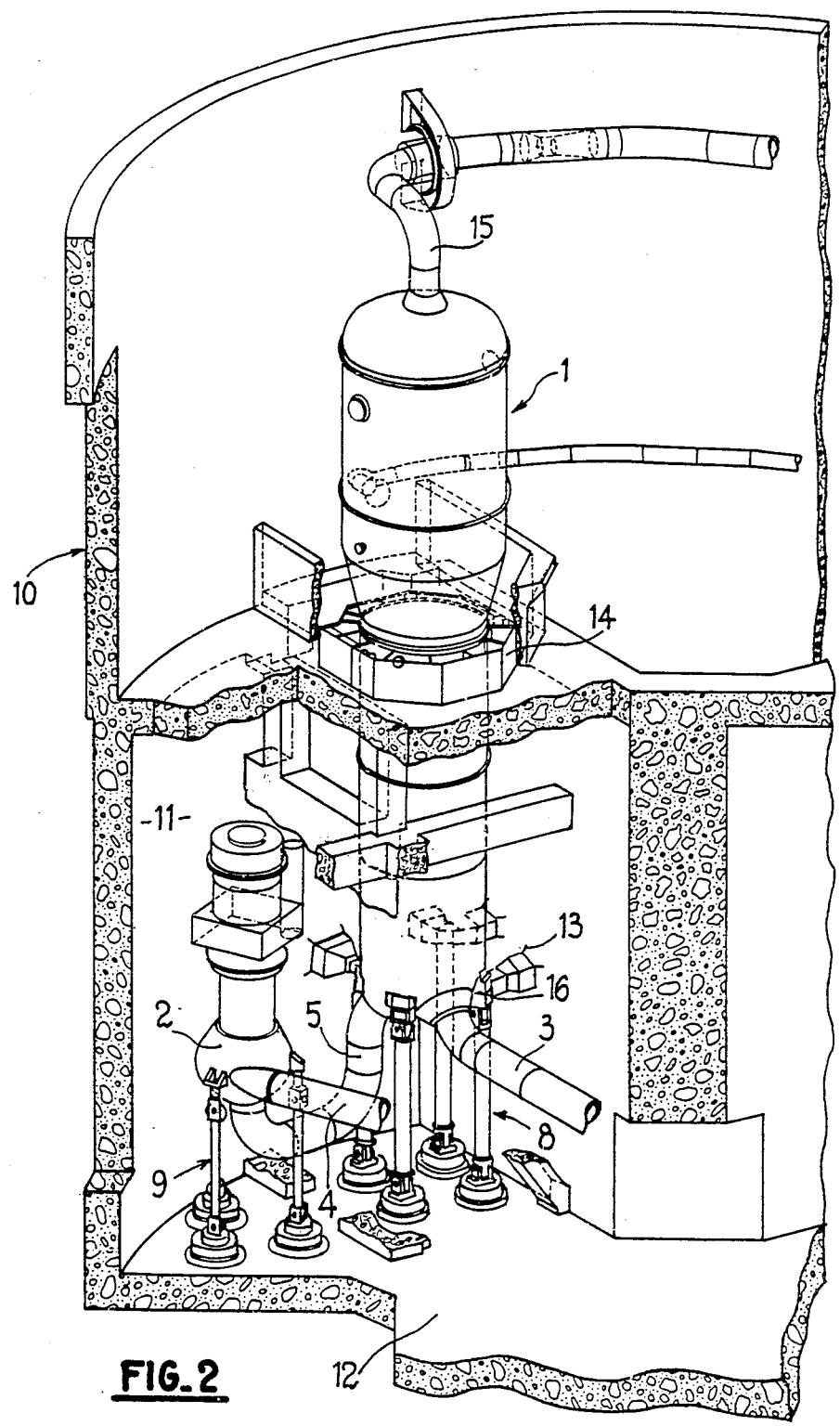
FIG. 2 is a perspective view of the worn-out steam generator in place in its compartment.

FIG. 2 shows a part of the reactor building 10 which contains the vessel 6 and the whole primary circuit of the reactor.

The part of the reactor building 10 shown in FIG. 2 shows a compartment 11 or bunker intended to receive a steam generator 1. The steam generator rests on the floor 12 of the bunker 11 by means of the articulated props 8. The centering and the positioning of the steam generator 1 in the bunker 11 are provided at the rings 13 and 14, the ring 13 consisting of 6 lateral abutments 17 attached to three of the bunker walls.

The casing of the steam generator 1 is connected by its top part to a steam outlet pipe 15.

Figure 3:
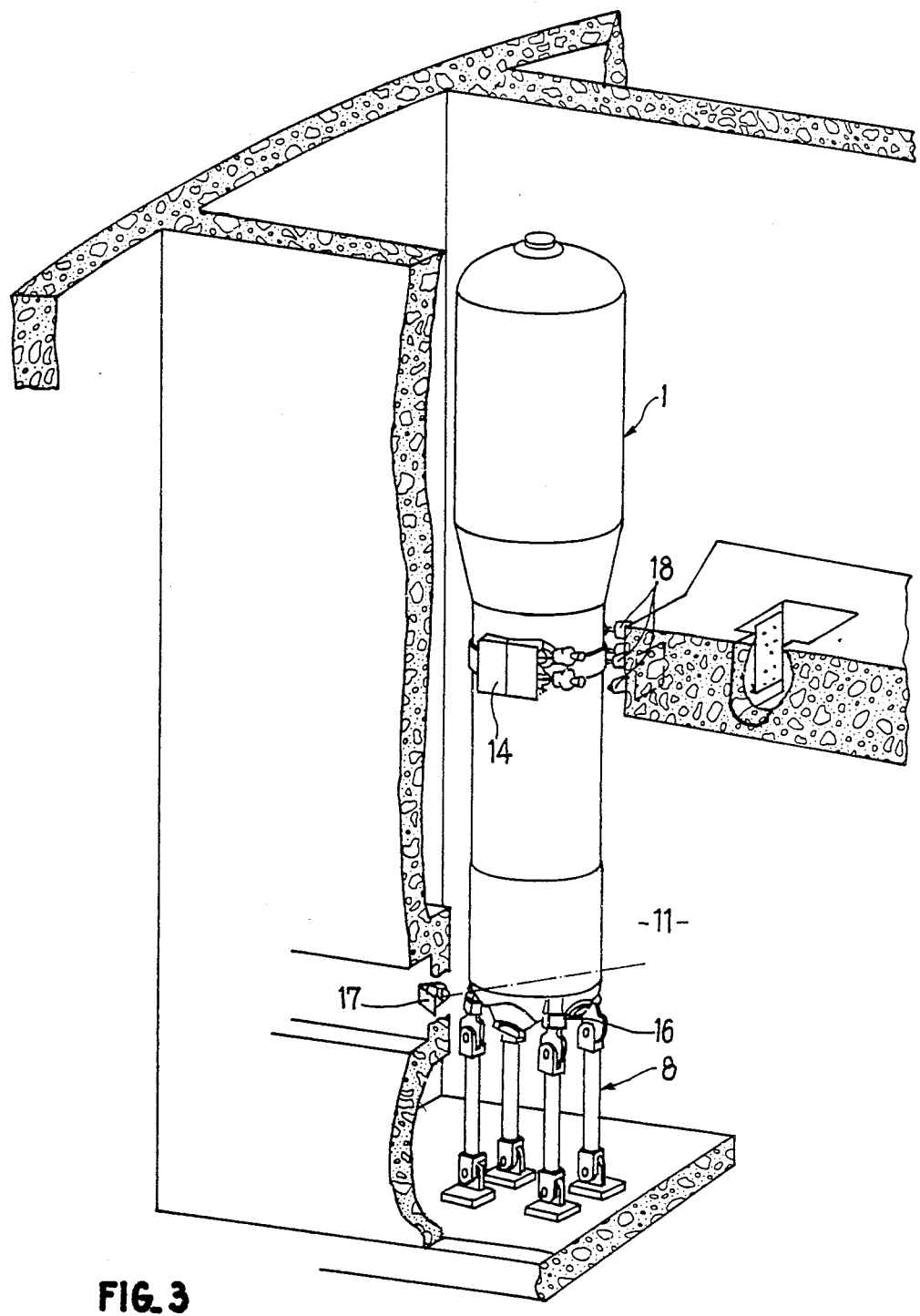
FIG. 3 is a perspective view of the steam generator in place in its compartment, showing the devices for supporting and positioning of this steam generator.

As can be seen in FIGS. 2 and 3, in line with each of the props of the supporting assembly 8, the steam generator 1 has an abutment sliding plate 16 intended to provide the steam generator 1 with horizontal support, in association with an abutment 17 fastened to the bunker wall 11. Bearing devices 18 consisting of dampers are anchored in an intermediate floor of the bunker 11, at the upper ring 14. These dampers 18 come to bear on the ring 14 and, like the assemblies 16 and 17, provide the horizontal support and the retention of the steam generator in its bunker.

Both the horizontal support devices and the props 8 allow the steam generator a certain play inside its bunker, a certain displacement of the steam generator body being possible, within the permissible limits, during its operation.

The steam generator 1 shown in FIGS. 1, 2 and 3 is a worn-out steam generator whose tube bundle, arranged inside the body, has suffered a degree of deterioration in service, with the result that it is intended to carry out a complete replacement of this steam generator.

To this end, a new replacement steam generator which is to be substituted for the steam generator 1 has been manufactured in the workshop.

Figure 4:
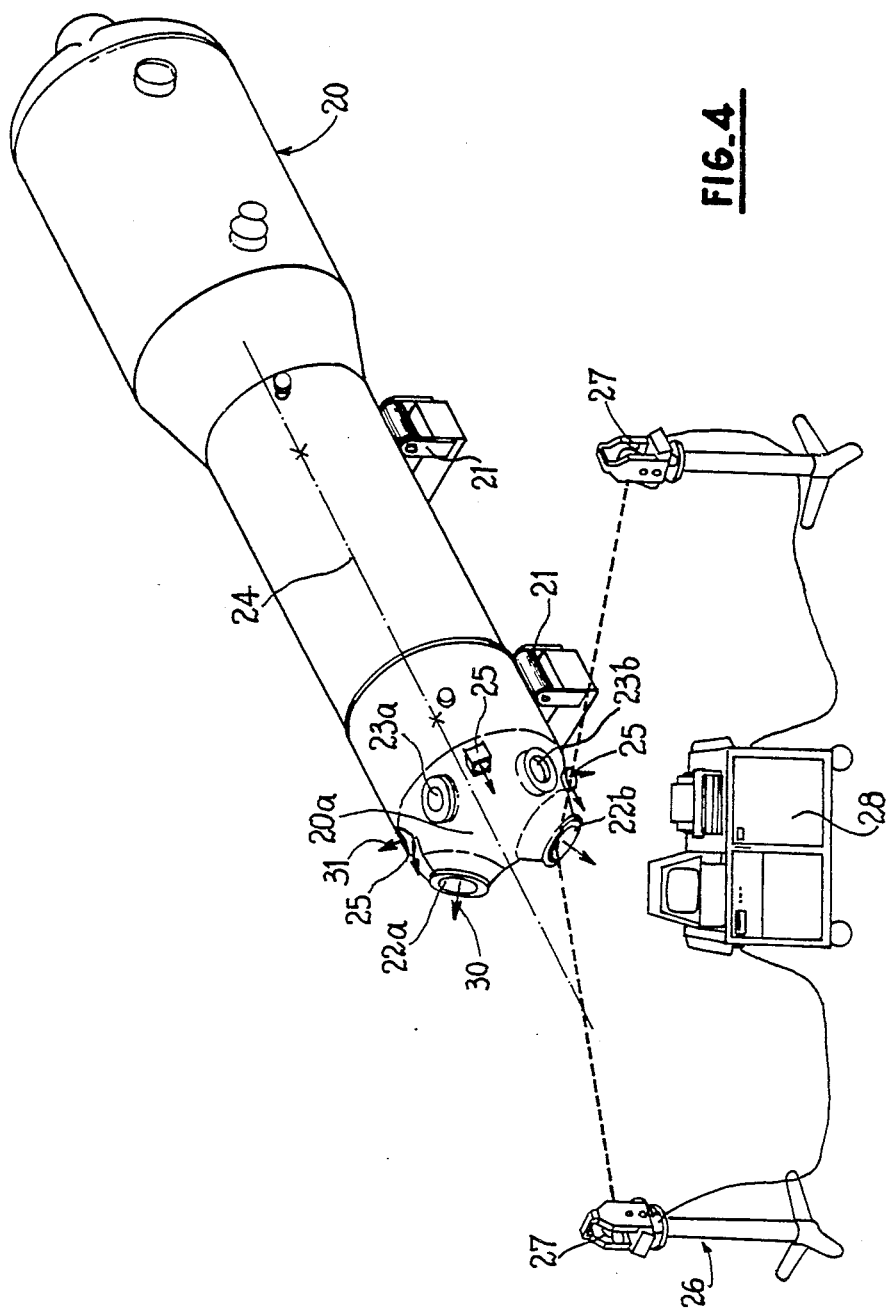
FIG. 4 is a perspective view of the new replacement steam generator and of the topometric measurement devices when being used during a first stage of the replacement procedure.

This new replacement steam generator 20 is shown in FIG. 4 in a horizontal position on supporting devices 21. The lower part 20a of the generator 2, forming the water box, comprises two pipeworks 22a and 22b intended to be connected to the primary pipes 3 and 5 of the loop shown in FIGS. 1, 2 and 3, after the removal of the worn-out steam generator 1. The bottom 20a of the steam generator is also pierced with openings 23a and 23b forming entry openings or manholes making it possible to gain access to the interior part of the water box.

The outer wall of the lower part 20a of the steam generator has projecting parts 25 forming feet for supporting the steam generator.

Before the replacement of a worn-out steam generator with a new generator such as the generator 20 is carried out, certain topometric measurements are carried out in the workshop, as shown in FIG. 4. The steam generator 20 is arranged with its axis 24 in a substantially horizontal position and a topometric measurement instrumentation 26 is arranged in the vicinity of the lower part 20a of the steam generator, to perform highly accurate measurements. The topometric measurement instrumentation of a conventional type comprises sighting telescopes 27 and a measurement processing, recording and display unit 28.

The topometric measurements which are carried out relate to the position and the direction of the steam generator axis 24 and, as shown by the arrows 30 and 31, to the position and the direction of the pipework 22a, 22b and the bearing faces of the feet 25.

Topometric measurements are also performed on other parts of the steam generator, to determine the exact position of the bearing regions of the upper ring and of the pipework for connection to the steam line 15.

Other topometric measurements are performed on the worn-out steam generator, inside the bunker 11 in which this steam generator is placed. The topometric measurements which are carried out by employing an instrumentation of the type of that shown in FIG. 4 permit an accurate determination of the position of the pipework connecting the primary pipes to the worn-out steam generator and the position of the horizontal and vertical bearing and supporting surfaces.

The topometric measurements are recorded and compared with the topometric measurements performed on the new replacement steam generator.

This comparison permits a preliminary determination of the procedure for replacing the steam generator, i.e., the number and the position of the sectioning operations to be carried out on the primary pipes and the modifications to be made to the vertical and horizontal support devices.

The system of reference axes in which the position of the various members for connecting, supporting and positioning of the steam generator is determined comprises a first horizontal axis OX corresponding to the axis of the hot leg 3 and a second horizontal axis OY, perpendicular to the first, situated in the vertical plane containing the axis of the U leg 5, with both these axes intersecting on the vertical axis of the generator. The third axis OZ of the reference system conincides with the steam generator axis if the latter is perfectly vertical.

Reference will now be made to FIGS. 6a, 6b, 7a and 7b to indicate the guiding principles by which the procedure for the replacement of the steam generator is determined.

Figure 6A:
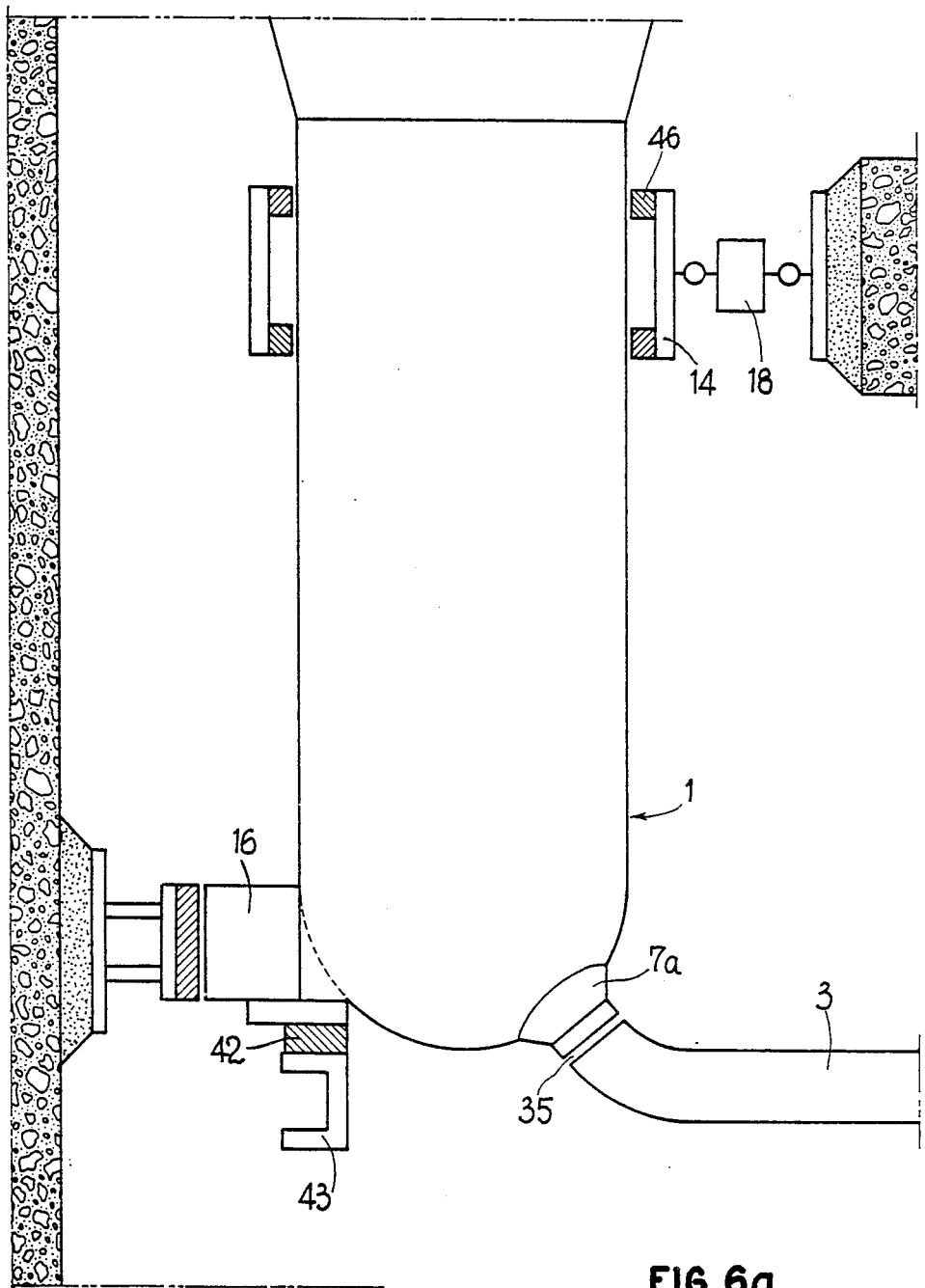
FIGS. 6a and 6b are diagrammatic, partially sectioned elevation views of the steam generator and of the devices for supporting and positioning this generator.
Figure 6B:
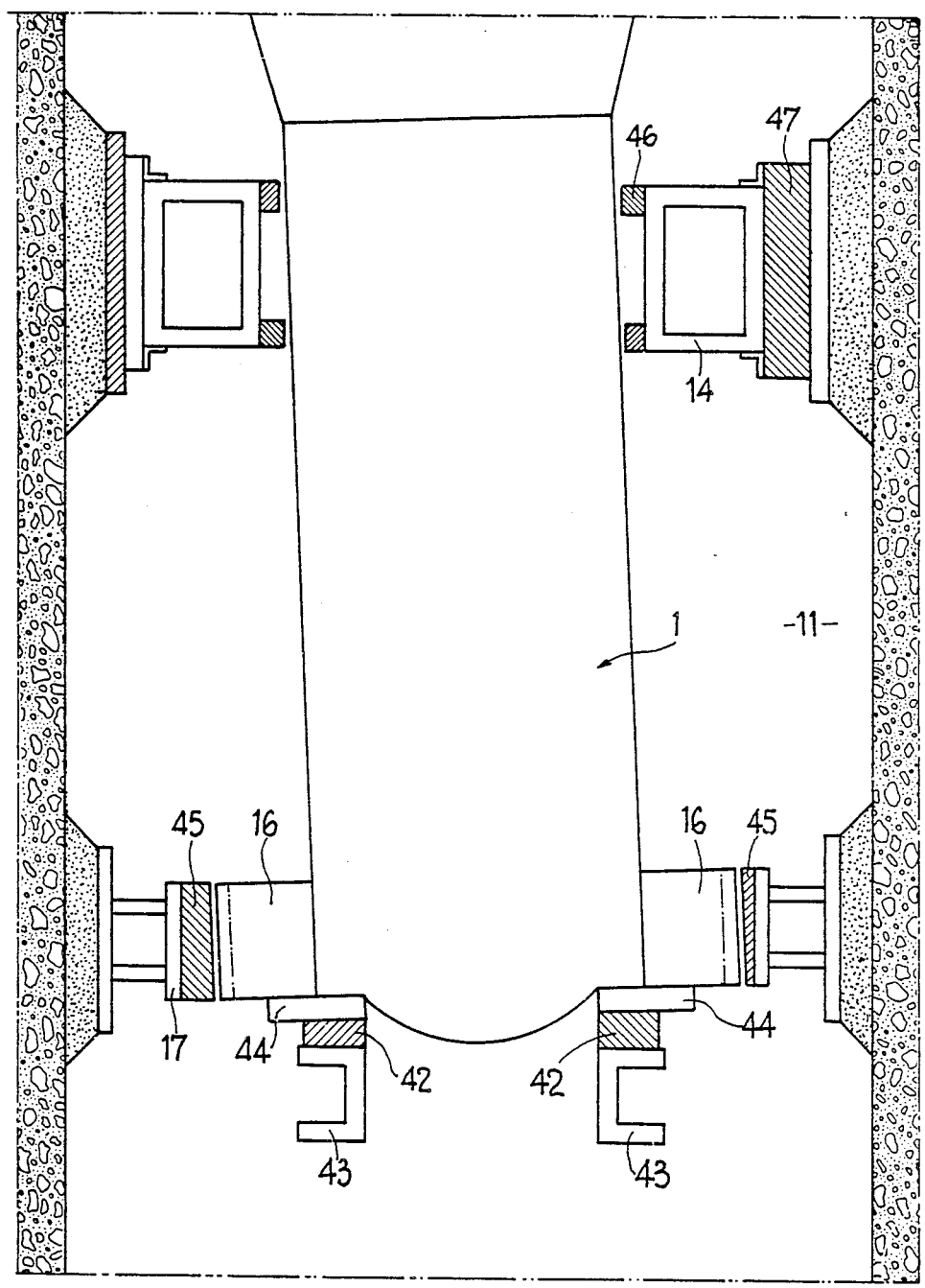

FIG. 6a is a diagrammatic elevation view of the steam generator in the direction at right angles to the axis of the hot leg. FIG. 6b is a view in a direction parallel to the axis of the hot leg.

Figure 7A:
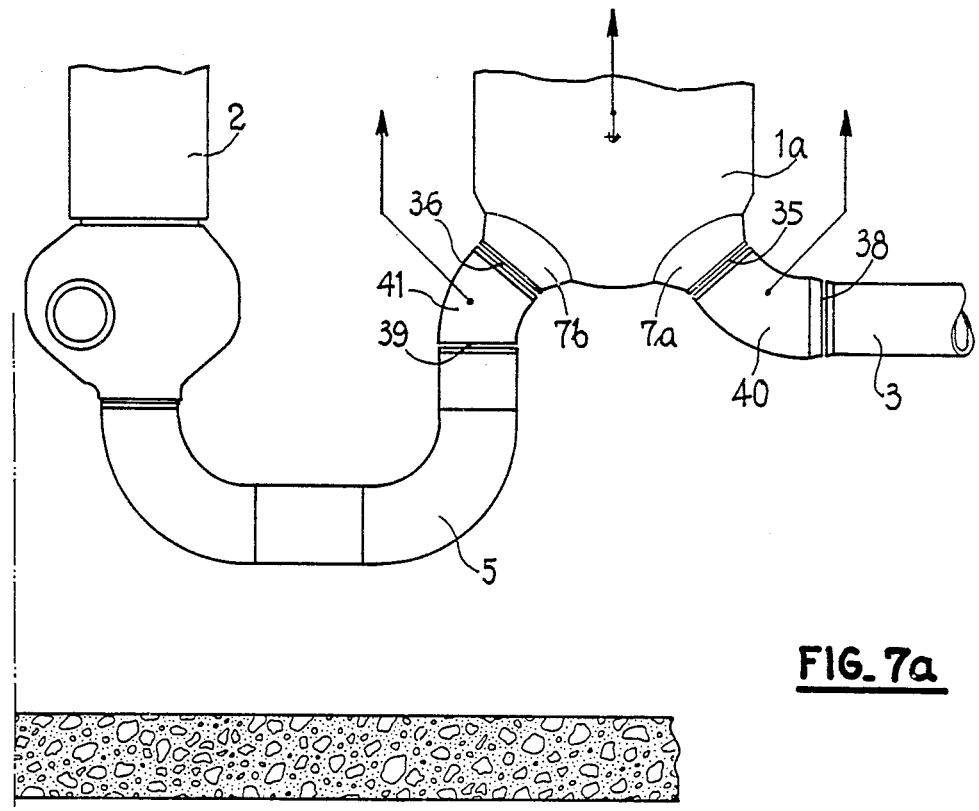
FIG. 7a is a diagrammatic elevation view of the lower part of the steam generator and of the primary circuit pipes, showing the various possibilities of sectioning of these pipes.
Figure 7B:
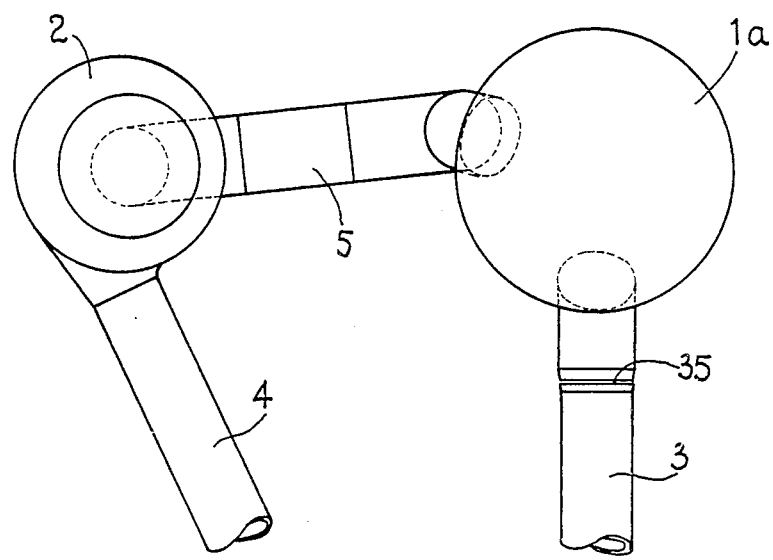

FIGS. 6a, 7a and 7b show several examples of sectioning operations which may be performed on the hot leg 3 and on the U leg 5, to separate the worn-out steam generator 1 from the primary circuit.

The guiding principle determining the choice of the sectioning operations consists in effecting the sectioning as close as possible to the corresponding connecting pipework (7a or 7b), while retaining the possibility of subsequently connecting the new steam generator to the ends of the primary pipes left in preparation.

The sectioning should also make it possible to discard the ferritic steel region of the primary pipes in the vicinity of the connecting welds of the worn-out steam generator.

FIGS. 6a, 7a and 7b show a section 35 enabling the hot leg to be separated from the corresponding pipework 7a of the steam generator. FIG. 7a also shows the section 36 enabling the second pipework 7b to be separated from the U leg 5.

The comparison of the topometric measurements which are carried out beforehand is primarily intended to determine whether two sectioning operations such as 35 and 36 are sufficient to permit the new steam generator to be connected up, given its geometry as determined by topometric measurement, to the ends of the primary pipes 3 and 5 left in preparation after the sectioning operations 35 and 36 have been carried out and the steam generator 1 has been withdrawn from its bunker 11.

One of the possibilities is, therefore, the determination of a procedure involving only two sectioning operations 35 and 36.

The comparison of the topometric measurements may also reveal the impossibility of carrying out the connection of the new steam generator merely by carrying out the two sectioning operations 35 and 36. In this case, after the generator 1 has been withdrawn from its bunker, two new sectioning operations 38 and 39 must be performed to separate the bends 40 and 41 from the corresponding primary pipes, these bends 40 and 41 being subsequently replaced by two bends of different geometry which are welded to the end of the pipes 3 and 5. These new bends make it possible to adapt to the geometry of the bottom of the replacement steam generator 20.

The sectioning operations 35 and 36 and, if appropriate, the sectioning operations 38 and 39 are performed by an orbital sectioning machine placed in position after decontamination of the region to be sectioned.

The comparison of the topometric measurements carried out on the new replacement steam generator 20 with the topometric measurements carried out on the worn-out steam generator and on the primary circuit also makes it possible to determine the modifications to be made to the devices for shimming and positioning of the steam generator.

These shimming and positioning devices are shown diagrammatically in FIGS. 6a and 6b.

These devices principally include vertical adjustment shims 42 which are inserted between the bearing plates 44 fastened to the feet of the steam generator 1 and the bearings (43) forming the top part of the props 8 supporting the steam generator.

It can be seen that the adjustment shims 42 may be machined with their faces slightly inclined relative to each other in order to make a correction to the direction of the steam generator axis.

The supporting and positioning devices also include adjustment shims 45 inserted between the sliding plates 16 of the steam generator which is fastened onto the bearing plates 44 and the abutments 17 fastened to the walls of the steam generator bunker 11.

Lastly, these devices include shims 46 inserted between the ring 14 and the steam generator body 1 and shims 47 inserted between the ring 14 and bearing plates fastened to the walls of the bunker 11.

The size and the shape of these shims may be determined in advance from the comparison of the topometric measurements.

This determination will need to allow for the operating clearances which are to be left between the steam generator and its bearings.

Figure 5:
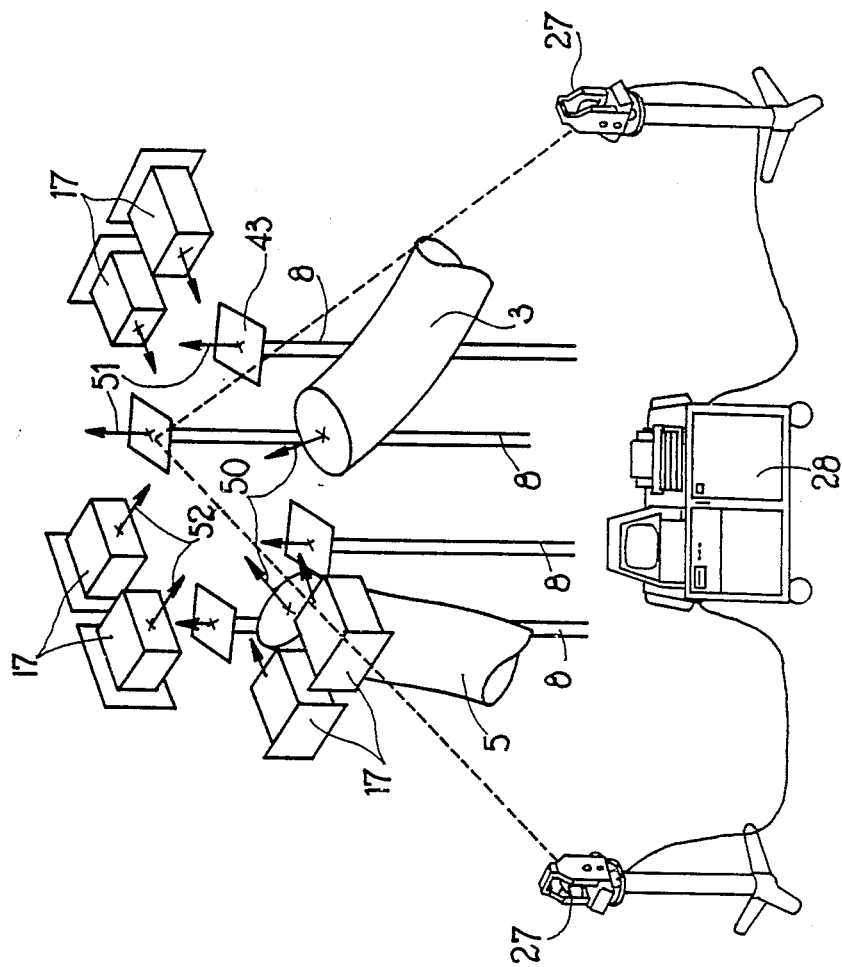
FIG. 5 is a diagrammatic view of the ends of the primary pipes, of the devices for supporting and positioning of the steam generator and of the topometric measurement devices while being used during a first stage of the replacement process according to the invention.

FIG. 5 shows the supporting and bearing connections left in preparation in the steam generator bunker after removal of the worn-out steam generator.

Topometric measurements are carried out on these components by virtue of an instrumentation of the same type as that shown in FIG. 4 and comprising sighting telescopes 27 and a measurement processing, recording and display unit 28.

These measurements are carried out after the primary pipes have been clamped in the position which they are to occupy after the welding of the new steam generator.

The topometric measurements cover the position and the direction of the connection planes of the primary pipes 3 and 5 and of the bearing planes of the vertical support devices 43 and of the horizontal support devices 17. These measured positions and directions are shown in FIG. 5 by means of the arrows 50, 51 and 52.

It should be noted that, before carrying out the topometric measurements on the ends of the pipes 3 and 5 to determine the position of the connection planes, a grinding operation is performed on these end faces of the pipes, after their sectioning.

The result of the topometric measurements carried out in the bunker 11 after removal of the worn-out steam generator is compared with the result of the topometric measurements carried out on the new replacement steam generator. From this comparison, the exact position of the connection plane between the pipeworks 22a and 22b of the new generator and the end parts of the corresponding pipes 3 and 5 is deduced. This determination is expressed by the plotting of a circular line on the external surface of the pipes 3 and 5.

It will be seen later that this plot may be performed or checked by employing a framework reproducing the principal components of the bottom of the steam generator.

Comparison of the measurements also makes it possible to determine more accurately than previously the shape to be given the shimming components and to the sliding plates of the steam generator, as a function of the geometry of the new steam generator 20 and of the bearings 17 and 43 left in preparation in the steam generator bunker.

Figure 8:
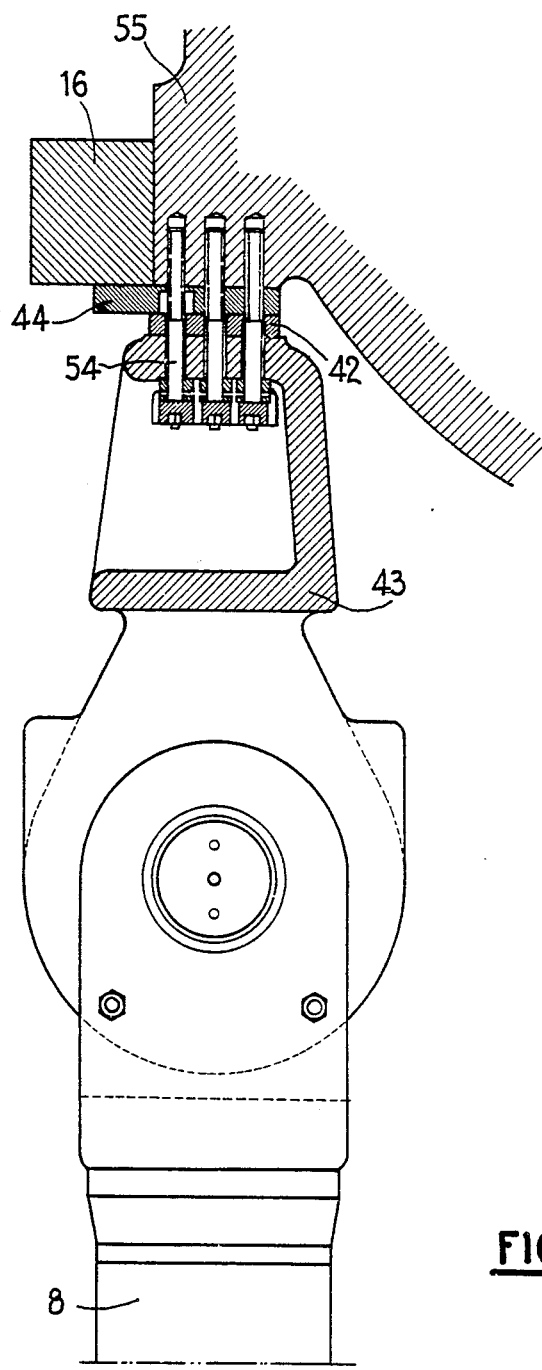
FIG. 8 is a partially sectioned elevation view of a device for supporting the steam generator vertically.

FIG. 8 shows the part of the end of a prop 8 comprising a bearing bracket 43 pierced by holes through which pass the assembly bolts 54. The assembly bolts 54 pass through aligned holes in the vertical adjustment shim 42 and in the bearing plate 44 and are screwed into tapped holes provided in the corresponding foot 55 of the steam generator. The sliding plate 16 is bolted to the bearing plate 44 which projects relative to the foot 55.

Figure 9A:
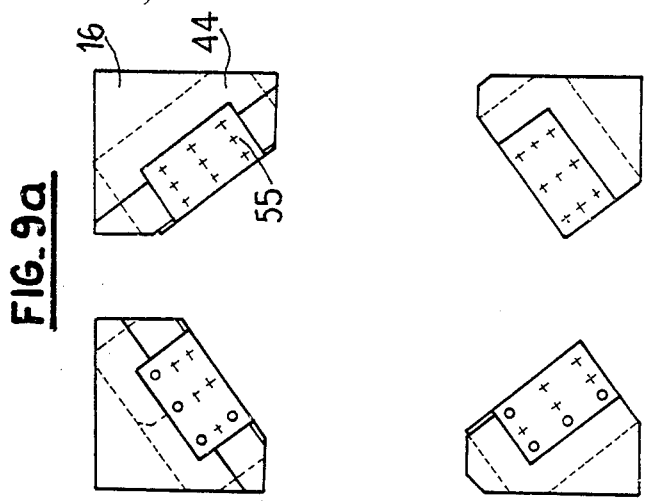
FIG. 9a is a plan view of the devices for supporting and positioning the steam generator which are intended to interact with the corresponding devices placed in the bunker.
Figure 9:
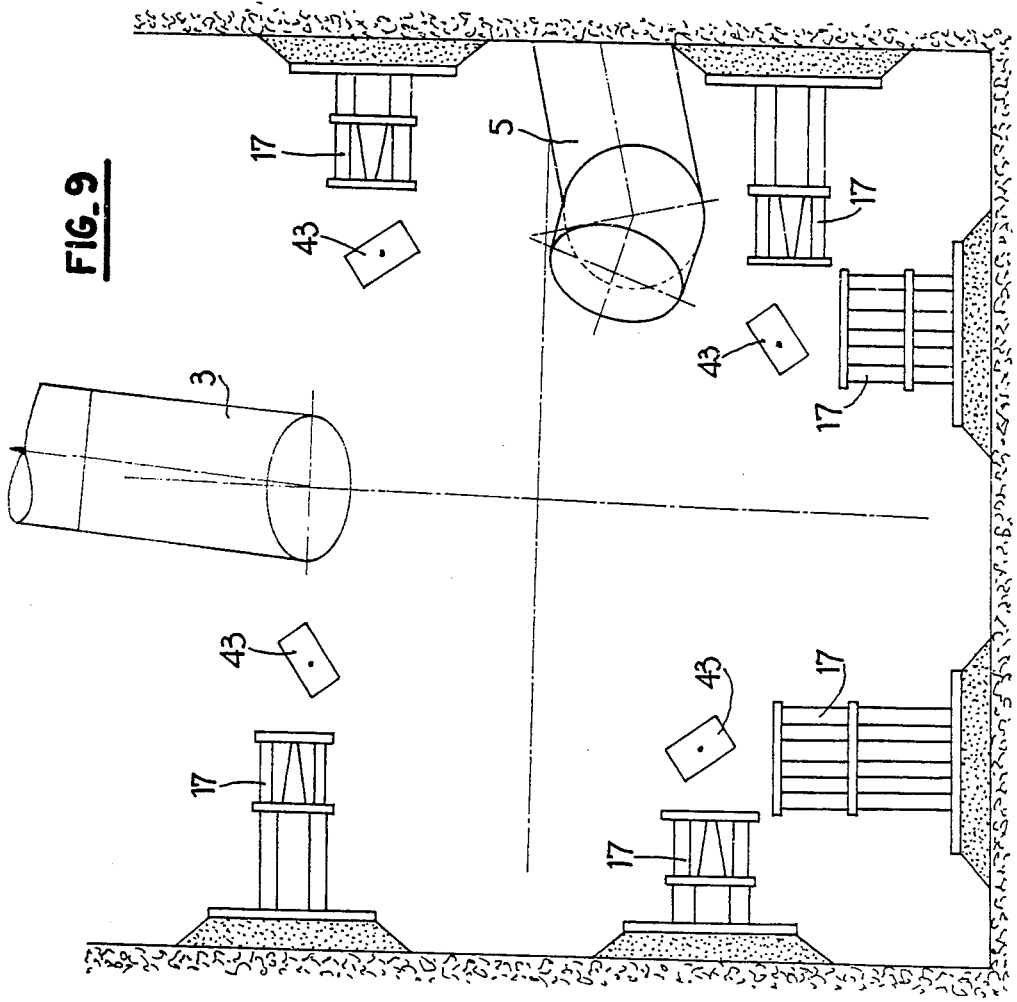
FIG. 9 is a plan view of the steam generator bunker showing the prepared primary pipes and the devices for supporting and positioning the steam generator.

FIG. 9, which shows the prepared components in the steam generator bunker, shows, in plan view, the distribution of the bearing abutments 17 interacting with the sliding plates 16 of the steam generator, for its horizontal support, and the bearing surfaces of the brackets 43 on which the feet 55 of the steam generator come to rest.

FIG. 9a shows, in plan view, the sliding plates 16 and the corresponding feet 55 of the steam generator.

Comparison of the topometric measurements carried out on the prepared components and on the new steam generator makes it possible to determine the exact shape of the sliding plates 16 and of the associated vertical and horizontal adjustment shims at the foot of the steam generator.

Thus, after the stages of the procedure which have been described, means are available for fitting the new replacement steam generator with bearing devices which are adapted to its being fitted into the bunker of the worn-out steam generator.

The comparison of the topometric measurements also makes it possible to plot the exact connection planes on the pipes 3 and 5 which have been left in preparation.

Figure 10:
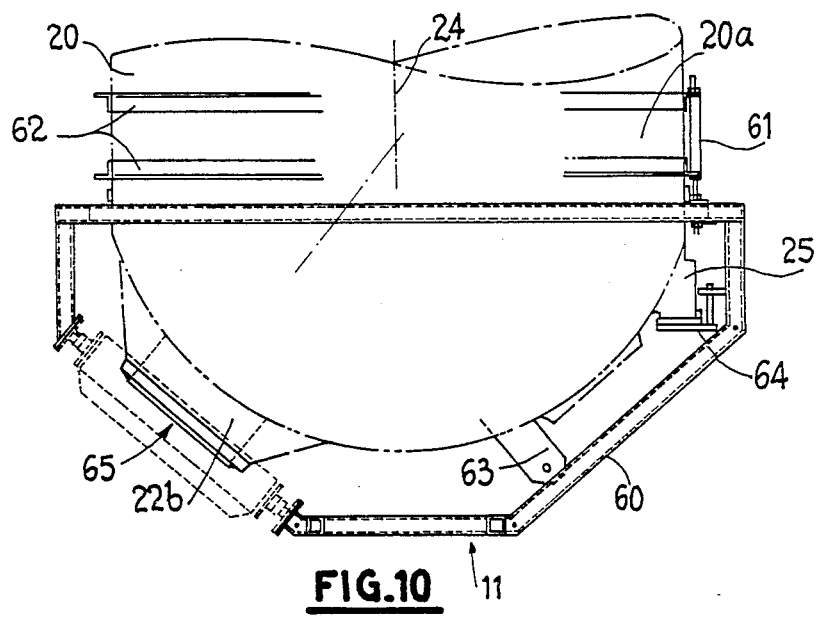
FIG. 10 is an elevation view of a mounting framework associated with the lower end of the steam generator.
Figure 11:
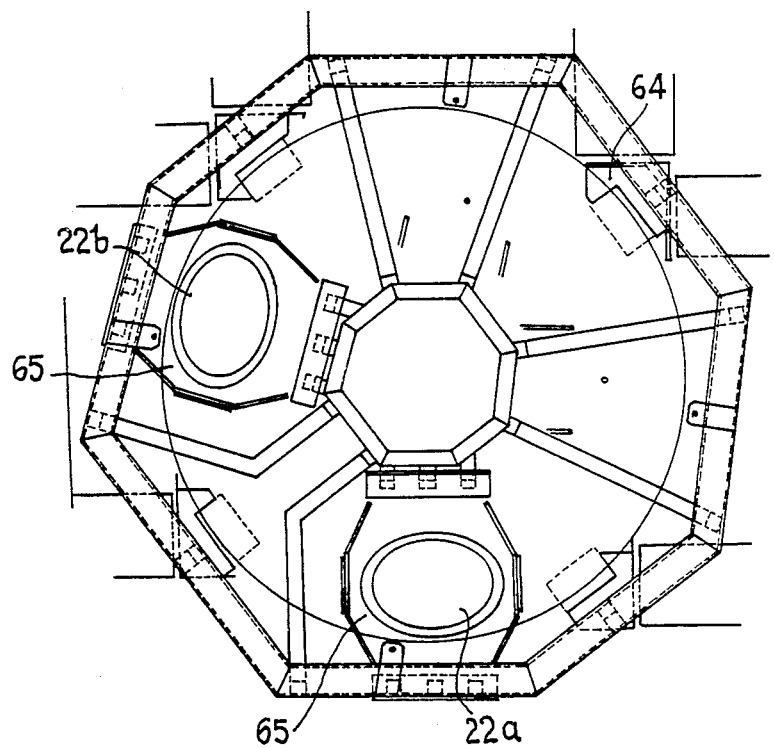
FIG. 11 is a bottom view in direction 11 of FIG. 10.

Before performing the machining of the welding chamfers on the pipes which have been left in preparation, with their end faces representing the connection plane, a check is made nevertheless by employing a mounting framework such as shown in FIGS. 10 and 11.

A framework of this kind comprises a welded and bolted structure 60 in the shape of a truncated pyramid whose polygonal base comprises an opening of sufficient size to permit the passage of the lower part 20a of the steam generator. The mounting framework 60 comprises fastening members 61 enabling it to be attached to two fastening rings 62, themselves attached to the outer surface of the steam generator.

In a first stage, the mounting framework is placed in position and is fastened by virture of the devices 61, 62 by virtue of lugs 63, to the bottom of the new steam generator 20 which is to replace the worn-out steam generator withdrawn from the bunker 11.

When the positioning of the structure of the mounting framework on the bottom of the steam generator is ensured so that the axis of the framework is in perfect coincidence with the steam generator axis 24, there are fastened onto this framework 60 devices 64 and 65 intended to represent physically the position of the sliding plates and of the bearing shims on the framework reproducing the bottom of the steam generator and to plot or to check the circular line representing the connection plane on the primary pipes.

In order to perform the plotting or the checking of the connection plane, two devices 65 are employed and these are positioned on the framework in positions corresponding to the pipework 22a and 22b and whose structure is shown in FIGS. 12 and 13.

In FIG. 12, the device 65 has been shown at the end of its positioning at a pipework, for example the pipework 22a for connection to the hot leg. This position corresponds to the position of the framework shown in FIGS. 10 and 11, where this framework 60 is placed in position on the lower end of the new steam generator.

The device 65 comprises an outer crown ring 66 onto which are welded two members 67 for fastening in radial direction.

Axial holes are machined in the outer crown ring 66 and in the fastening components 67. Two trunnions 68 are mounted in the axial holes for rotation around the axis 69. An inner crown ring 70 is mounted for rotation around the axis 69, inside the outer crown ring 66, by virtue of removable axial end-pieces 71. The inner crown ring 70 carries an adjustment ring 72 on which are mounted screw centering and adjusting assemblies 73. Perfect positioning and centering of the device relative to the connection end of the pipework 22a is ensured by means of the devices 73, when the framework is in position on the new steam generator. A clamping stirrup 74 enables the device 65 to be held in its adjustment position while it is being fastened by welding onto the framework 60.

When the two devices 65 corresponding to the pipework 22a and 22b of the new steam generator are placed in position and fastened to the framework, the plane at right angles to the axis of the pipework 22a passing through the axis 69 of the device 65 perfectly represents physically the plane of connection of the pipework to the primary pipe left in preparation in the steam generator bunker.

When the mounting framework is positioned on the lower part of the steam generator, as shown in FIGS. 10 and 11, the fitting of the centering feet, which are intended to represent physically the position of the feet and of the sliding plates of the steam generator to be installed, is also carried out.

A foot 64 of this kind has been shown in FIGS. 14, 15 and 16. The foot 64 comprises an upright 81 intended to ensure its connection to the framework 60 and a plate 82 or false sliding plate whose cross-section in plan view reproduces exactly the shape and the dimensions of a sliding plate of the new steam generator as they are defined by the topometric measurements, thus permitting perfect horizontal shimming of the replacement steam generator in the bunker 11 of the worn-out steam generator. Thus, the shape of these false skidding plates in plan view reproduces substantially the shapes of the skidding plates 16 shown in FIG. 9a.

The bearing plate 82 is fixed by its bottom face to a vertical adjustment shim 83 intended to represent physically on the framework the definitive adjustment shim, such as the shim 42 shown in FIG. 8. The plate 82 and the shim 83 are intended to replace, on the framework, the bearing plate 44 and the shim 42, which are shown in FIG. 8.

The plate 82 also carries three blocks 84 by means of bolts 85 whose position is adjusted in order to ensure positioning of the foot 64 against the corresponding foot 25 of the new steam generator, whose outline is shown in dotted lines in FIG. 14.

Stud sockets 86 are provided throughout the thickness of the plate 82 and the shim 83. When the foot 64 is placed so as to coincide with a foot 25 of the new generator, by virtue of the blocks 84, the holes 86 permit the passage of studs for assembling the foot 64 of the framework with the foot 25 of the new steam generator. With the framework positioned on the new steam generator, as shown in FIGS. 10 and 11, the fitting of the four feet 64 onto the corresponding feet 25 of the steam generator is carried out and then these feet are fastened onto the framework by means of the uprights 81, which are rigidly fastened onto this framework 60.

The framework is then ready to be transported to the bunker of the worn-out steam generator, in order to check the position of the connection planes and of the bearing surfaces as determined by topometric measurements.

The stirrups 74 of the devices 65 are removed, the assembly studs on the feet of the steam generator are unbolted and the framework is separated from the new steam generator. The centering and positioning devices 73 of the assemblies 65 are removed and the inner crown ring 70, 72 of the devices 65 is pivoted through 180°, this inner crown ring 70, 72 being placed and held in its second position, shown in FIG. 13.

The mounting framework 60 is brought into the bunker 11 of the worn-out steam generator and is placed in the exact position which is to be occupied by the bottom of the new steam generator 20. In this position, the false sliding plates 82 of the feet 64 lodge in the spaces provided between the abutments 17, and the locations of the steam generator feet 28 are superposed on the bearing surfaces of the brackets 43 of the props 8. The alignment of the stud holes 86 with the holes provided in the brackets 43 and the perfect positioning of the mounting framework 60 representing the lower part of the new steam generator 20 are checked.

The devices 65 which physically represent the connection planes are placed on the ends of the primary pipes in the manner shown in FIG. 13. The adjustment ring 72 of each of the devices 65 comprises four bores 75 through which pass scribers enabling a circular line to be scribed on the outer surface of the pipe 3 (or 5), this circular line perfectly representing physically the position of the plane of connection of the corresponding pipework 22a (or 22b) to the pipe.

In this manner it is possible either to scribe the line representing physically the end plane of the welding chamfer or to check the position of a line scribed previously, by employing the results of topometric measurements.

Figure 17:
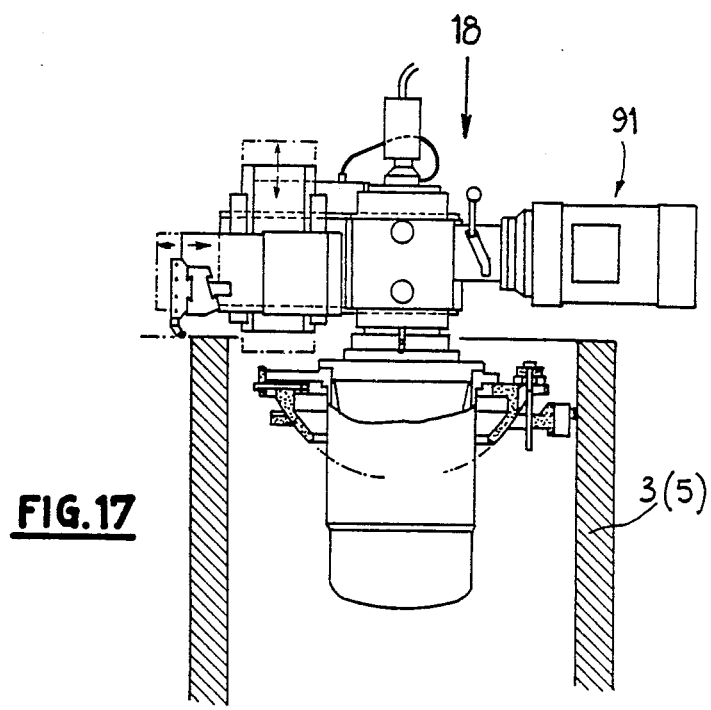
FIG. 17 is an elevation view of a machine for machining a chamfer in the working position at the end of a primary pipe.
Figure 18:
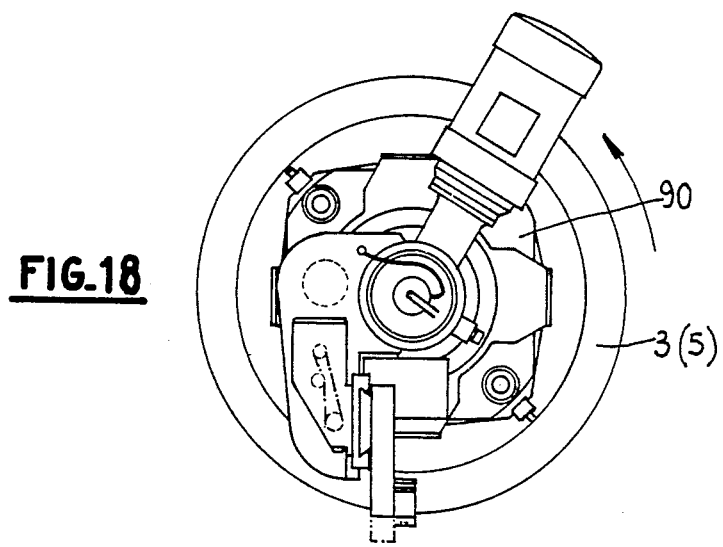
FIG. 18 is a plan view in direction 18 of FIG. 17.

When the checks have been carried out, a welding chamfer is machined on the end of the pipes 3 and 5, using a chamfering machine of the orbital type, such as shown in FIGS. 17 and 18. A machine of this kind comprises a stationary part 90 which can be centered inside the pipe 3 (or 5) and a part 91 which can move in rotation relative to the part 90, around an axis whose positioning is defined during the centering and the positioning of the part 90 inside the pipe 3 (or 5).

The adjustment of the working position of the weld chamfering machine on each of the pipes can advantageously be made by employing the adjusting device described in applicant's French patent application filed simultaneously with the present patent application.

In fact, the results of the topometric measurements and/or the plot obtained by virtue of the mounting framework make it possible to determine the position of the chamfer and of its axis corresponding to the machining axis of the machine 90, 91. This axis is generally not the axis of the pipework, both in respect of its direction and its position relative to the machined section.

When the chamfer machinery has been carried out on the ends of each of the primary pipes 3 and 5, the new replacement steam generator is positioned in the bunker 11, in the place of the framework, this generator being perfectly located in the vertical support devices and between the horizontal support abutments. Similarly, the pipework connection planes correspond perfectly to the connection planes of the chamfers machined on the primary pipes.

The welded connection can then be made, for example by virtue of a TIG orbital welding process, such as described in applicant's French Patent Application No. 87/00,590.

Advantageously, after they have been sectioned, the primary pipes are clamped in the positions which they are to occupy after welding. In this positioning by clamping, allowance is made for the shrinkage which accompanies the welding.

Thus, the procedure according to the invention permits a complete replacement of a worn-out steam generator by perfectly determining the refitting procedure, the modifications to be made to the supporting devices and the position of the planes of connection of the steam generator to the primary pipes.

The invention is not limited to the embodiment which has been described. Thus, the various positioning and shimming members employed can be adapted to the positioning and shimming members of the worn-out steam generator which is being replaced, according to the replacement procedure which is chosen.

No precise description has been given of the manner in which the steam generator is connected to components such as the steam discharge pipework. The position of such components is less critical than that of the primary pipes or the lower support or shimming means, and the adapting of their connection does not present a special problem, once the support, the shimming and the connection of the lower part of the steam generator have been completed.

The method according to the invention applies to the replacement of any steam generator of a pressurized water nuclear reactor.

I claim:

1. In a method for the complete replacement of a worn-out steam generator (1) of a pressurized water nuclear reactor comprising a reactor building (10) defining a compartment (11) in which the steam generator (1) is retained in a specified position by means of supporting and positioning devices (8, 17) placed in said compartment, and a primary circuit (3, 4, 5) in said reactor building (10) in which primary circuit pressurized water circulates, said primary circuit comprising two pipes (3,5) connected to a lower part of said worn-out steam generator (1) in the region of corresponding nozzles of said worn-out steam generator, said method comprising the steps of separating said worn-out steam generator (1) from said primary circuit by sectioning said pipes (3, 5) in the vicinity of pipework of said worn-out steam generator (1), withdrawing said worn-out steam generator from said compartment (11), placing a replacement steam generator (20) in position in said compartment (11) and welding the nozzles (22a, 22b) of said replacement steam generator to said pipes (3, 5), in the region of welding chamfers, the improvement comprising the steps of (a) carrying out topometric measurements on said replacement steam generator (20) to determine exactly the position of supporting and positioning parts (25) of said replacement steam generator intended to come to bear on said supporting and positioning devices (8, 17) of said compartment (11) and the geometry of said nozzles (22a, 22b) for connection to said primary circuit (3, 5);

(b) carrying out topometric measurements in said compartment (11) and on said worn-out steam generator (1) to determine the geometry of said connection to said primary circuit (3, 5) and of said supporting and positioning devices (8, 17) of said compartment;

(c) comparing topometric measurements carried out to determine the number and the position of the sectioning operations to be carried out on said pipes (3, 5) of said primary circuit, and modifications to be made to the supporting and positioning devices (8, 17) of said compartment, for positioning said replacement steam generator (20);

(d) carrying out sectioning operations and withdrawal of said worn-out steam generator (1) from said compartment (11), and grinding the sectioned surfaces on said pipes (3, 5) of said primary circuit;

(e) carrying out topometric measurements in said compartment (11) after withdrawal of said worn-out steam generator (11), to determine the exact position of said supporting and positioning devices (8, 17) of said compartment and of sectioned ends of said pipes (3, 5) of said primary circuit;

(f) verifying the feasibility of employing the replacement procedure by comparison of the measurements carried out;

(g) determining the exact position of the welding chamfers on the ends of the primary pipes (3, 5); and (h) machining corresponding chamfers, placing said replacement steam generator (20) and its supporting and positioning devices in position and performing the welding connection of said nozzles (22a, 22b) and of said pipes (3, 5).

2. The improvement according to claim 1, comprising the steps of (a) producing a mounting framework reproducing a lower part (20a) of said replacement steam generator (20);

(b) producing supporting and positioning devices (64) reproducing said supporting and positioning devices of said replacement steam generator (20);

(c) producing members (65), each comprising a means for physically representing a connection plane;

(d) positioning said framework (60) onto said lower part (20a) of said replacement steam generator (20);

(e) positioning said devices (64) physically representing said devices for supporting and positioning said replacement steam generator, in position on supporting feet (25) of said replacement steam generator (20);
(f) aligning said producing members (65) with ends of said nozzles (22a, 22b) of said replacement steam generator (20), so as to represent physically a plane of connection of said nozzles;
(g) fastening said produced supporting and positioning devices (64) and said producing members (65) onto said framework (60); and
(h) positioning said framework (60) in said compartment (11) of said worn-out steam generator, after withdrawal of said worn-out steam generator, in place of said lower part (1a) of said worn-out steam generator, and thus checking the feasibility of implementing the replacement procedure, the position of planes of connection of said nozzles (22a, 22b) and of said primary pipes (3, 5) of said primary circuit, and the geometry and dimensions of said devices for supporting and positioning said replacement steam generator.

3. The improvement according to claim 2, comprising performing the determination and the scribing of the exact position of said welding chamfers on said ends of said pipes (3, 5) of said primary circuit, by employing said framework (60).

* * * * *